US007514154B2

(12) United States Patent
Matsubayashi et al.

(10) Patent No.: US 7,514,154 B2
(45) Date of Patent: Apr. 7, 2009

(54) RESIN-COATED STEEL PLATE AND PRESS MOLDED CAN USING THE SAME

(75) Inventors: Hiroshi Matsubayashi, Yokohama (JP); Shozo Ichinose, Yokohama (JP); Takashi Iwai, Yokohama (JP); Takehito Ifuku, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 10/507,013

(22) PCT Filed: Mar. 6, 2003

(86) PCT No.: PCT/JP03/02671

§ 371 (c)(1), (2), (4) Date: Sep. 8, 2004

(87) PCT Pub. No.: WO03/076183

PCT Pub. Date: Sep. 18, 2003

(65) Prior Publication Data

US 2005/0153157 A1 Jul. 14, 2005

(30) Foreign Application Priority Data

Mar. 8, 2002 (JP) ............................. 2002-064114
Mar. 8, 2002 (JP) ............................. 2002-064127

(51) Int. Cl.
*B32B 15/08* (2006.01)
*B32B 7/04* (2006.01)

(52) U.S. Cl. ....................... 428/626; 428/682; 428/684; 428/648; 428/659; 428/680; 428/447; 428/448; 428/458

(58) Field of Classification Search ................. 428/681, 428/682, 683, 684, 648, 659, 680, 626, 447, 428/448, 457, 458
See application file for complete search history.

(56) References Cited

U.S. PATENT DOCUMENTS 6,174,426 B1 * 1/2001 Osanaiye .................... 205/140

FOREIGN PATENT DOCUMENTS

EP 0 615 840 * 3/1994

(Continued)

OTHER PUBLICATIONS

International Search Report for PCT/JP03/02671 dated Jun. 24, 2003.

*Primary Examiner*—John J. Zimmerman
*Assistant Examiner*—Aaron Austin
(74) *Attorney, Agent, or Firm*—Sughrue Mion, PLLC

(57) ABSTRACT

A resin-coated steel plate obtained by providing, on at least one surface of the steel plate, (i-1) an alloy layer of iron and at least one metal selected from tin, zinc and nickel or (i-2) a tin-plated layer containing tin in an amount of not smaller than 0.5 $g/m^2$, (ii) a silane coupling agent-treated layer, and (iii) a thermoplastic polyester resin layer in this order from the side of the steel plate. Despite not containing chromium, the resin-coated steel plate exhibits excellent work adhesion properties between the steel blank and the organic resin film even when the thickness is reduced due to a severe working and even at portions subjected to severe working such as flanging and necking. By press-forming the resin-coated steel plate, there are obtained cans featuring excellent corrosion resistance and being adapted to containing even highly corrosive contents.

9 Claims, 2 Drawing Sheets

FOREIGN PATENT DOCUMENTS

| | | | | |
|---|---|---|---|---|
| EP | 0 816 063 | A1 | | 1/1998 |
| EP | 1 130 132 | A2 | | 9/2001 |
| EP | 1 142 700 | A1 | | 10/2001 |
| JP | 60-208480 | A | | 10/1985 |
| JP | 05-004302 | | * | 1/1993 |
| JP | 05-4302 | A | | 1/1993 |
| JP | 9-169078 | A | | 6/1997 |
| JP | 11-302898 | A | | 11/1999 |
| JP | 2001-316851 | A | | 11/2001 |
| JP | 2002-113809 | | * | 4/2002 |
| JP | 2002-113809 | A | | 4/2002 |
| JP | 2003-003281 | | * | 1/2003 |
| JP | 2003-3281 | A | | 1/2003 |
| KR | 85-001365 | B1 | | 9/1985 |

* cited by examiner

RESIN-COATED STEEL PLATE AND PRESS MOLDED CAN USING THE SAME

TECHNICAL FIELD

The present invention relates to a resin-coated steel plate and a press-formed can using the same. More specifically, the invention relates a resin-coated steel plate comprising a surface-treated steel plate without using hexavalent chromium in the step of production and exhibiting excellent work adhesion properties and corrosion resistance and capable of being press-formed into a can adapted to containing even highly corrosive contents, and to a press-formed can.

BACKGROUND ART

There has heretofore been used a two-piece can having a can wall and a can bottom molded integrally together without a junction portion in the can wall as a metal container for containing foods, beverages and aero sols. The two-piece can is formed through severe workings such as draw-ironing, draw working followed by stretch working, or draw working followed by stretch working and, further, ironing working (stretch-ironing).

The two-piece can has been produced by using a resin-coated steel plate obtained by coating a steel plate with a resin. From the standpoint of adhesion between the steel blank and the resin coating, work adhesion properties and corrosion resistance after the working, in particular, an electrolytic chromium/chromium oxide-coated steel plate (tin-free steel, hereinafter referred to as TFS) has been extensively used for producing cans having a reduced thickness through a severe working in which a ratio represented by the following formula (1) and an average plate thickness reduction ratio represented by the following formula (2) are, $$\text{Height } (H) \text{ of can/can diameter } (D) \geqq 1 \quad (1)$$

$$\{(\text{Initial plate thickness } (t_0) - \text{can wall thickness } (t)) / \text{initial plate thickness } (t_0)\} \times 100 \geqq 20\% \quad (2)$$

Japanese Unexamined Patent Publication (Kokai) No. 11-140691 teaches that a thermoplastic resin-coated steel plate obtained by forming a silane-treated film and a thermoplastic resin film on the TFS is suited for the use that is to be subjected to a severe working.

The resin-coated steel plate using the above TFS features excellent adhesion of the coated layer even when subjected to the above severe working and exhibits excellent corrosion resistance after the working. However, the TFS is the one obtained through a cathodic electrolytic treatment in a treating solution containing hexavalent chromium followed by the washing with water. Though hexavalent chromium is not contained in the TFS surface-treating film which is the finally formed product, the treating solution contains harmful hexavalent chromium arousing many problems from the environmental point of view.

That is, when the TFS is to be used, the drain water and exhaust gases of the treating solution containing hexavalent chromium must be completely treated so will not to be drained to the external side. Therefore, a tremendous amount of cost is required for the construction of the drain water treatment facility, exhaust gas treatment facility, and disposal of the waste. Besides, transporting the sludge of waste water and disposal thereof encounter stringent regulations. It has therefore been desired to produce thin cans through the above-mentioned severe working but by using a resin-coated steel plate obtained by using a metal blank other than the TFS.

A tin plate (tin-plated steel plate) has long been used. Usually, however, the tin plate is obtained by plating tin followed by the chemical treatment such as being immersed in a solution of dichromic acid or the electrolysis in this solution. It is further widely effected to coat the tin plate with a resin film in advance without, however, capable of withstanding the severe working for accomplishing a ratio of Height (H) of can/can diameter (D)≧1 and a plate thickness reduction ratio of not smaller than 20%.

In the press-formed can using the tin plate, therefore, a protection film must be formed by applying a coating material after the press-molding, arousing the problems of disposal and treatment of the organic solvent, and coping with the worsening working environment. It has further been desired to shorten the step of coating.

DISCLOSURE OF THE INVENTION

It is an object of the present invention to provide a chromium-free resin-coated steel plate featuring excellent film adhesion and workability even when the thickness is reduced through severe working.

Another object of the present invention is to provide a can having excellent corrosion resistance obtained by press-molding the resin-coated steel plate.

According to the present invention, there is provided a resin-coated steel plate obtained by providing, on at least one surface of the steel plate, (i-1) an alloy layer of iron and at least one metal selected from tin, zinc and nickel or (i-2) a tin-plated layer containing tin in an amount of not smaller than 0.5 g/$m^2$, (ii) a silane coupling agent-treated layer, and (iii) a thermoplastic polyester resin layer in this order from the side of the steel plate.

According to the resin-coated steel plate of the present invention it is desired that:

(1) When the alloy layer contains tin, the content of tin is in a range of larger than 0.05 g/$m^2$ but is smaller than 1.5 g/$m^2$, and when the alloy layer contains zinc or nickel, the content of zinc or nickel is larger than 0.03 g/$m^2$ but is smaller than 1.8 g/$m^2$;

(2) Part of the tin-plated layer on the side of the steel plate is a tin-iron alloy layer;

(3) The amount of Si in the silane coupling agent-treated layer is in a range of 0.8 to 18 mg/$m^2$;

(4) The silane coupling agent-treated layer is a layer formed by the treatment by using an amino group-containing silane solution and/or an epoxy group-containing silane coupling agent solution;

(5) The silane coupling agent-treated layer is a layer formed by the treatment by using a mixed solution of a silane coupling agent containing an amino group and/or an epoxy group and a silane containing an organic substituent and a hydrolyzing alkoxyl group;

(6) The silane coupling agent-treated layer is a layer treated with a silane containing an organic substituent and a hydrolyzing alkoxyl group and is, then, treated with a silane coupling agent solution comprising an amino group-containing silane solution and/or an epoxy group-containing silane solution;

(7) The thermoplastic polyester resin layer has a thickness of 8 to 42 μm;

(8) The thermoplastic polyester resin layer is a copolymerized resin layer of a polyethylene terephthalate;

(9) The thermoplastic polyester resin layer is a polyethylene terephthalate/isophthalate copolymerized resin layer; and

(10) The thermoplastic polyester resin layer is blended with an ionomer resin.

According to the present invention, further, there is provided a can obtained by press-molding the above resin-coated steel plate.

BEST MODE FOR CARRYING OUT THE INVENTION

Resin-Coated Steel Plate

According to the resin-coated steel plate of the present invention, an important feature resides in that on at least one surface of the steel plate, there are provided:

(i-1) an alloy layer of iron and at least one metal selected from tin, zinc and nickel; or (i-2) a tin-plated layer containing tin in an amount of not smaller than 0.5 $g/m^2$;

(ii) a silane coupling agent-treated layer; and (iii) a thermoplastic polyester resin layer;

in this order from the side of the steel plate.

Figure 1:
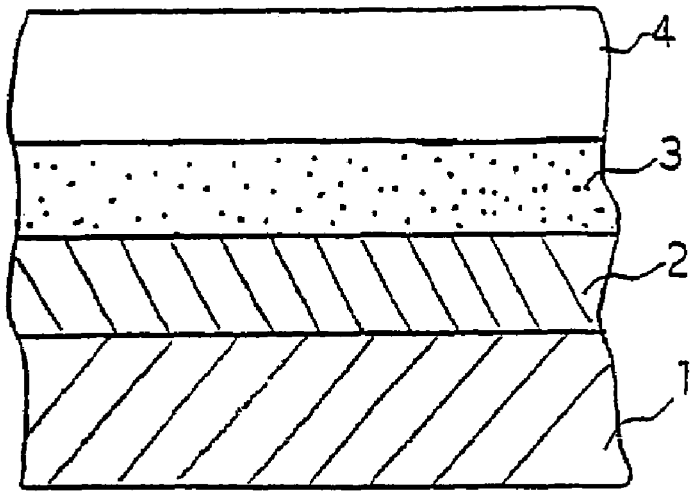
FIG. 1 is a sectional view illustrating a resin-coated steel plate of the present invention.
Figure 2:
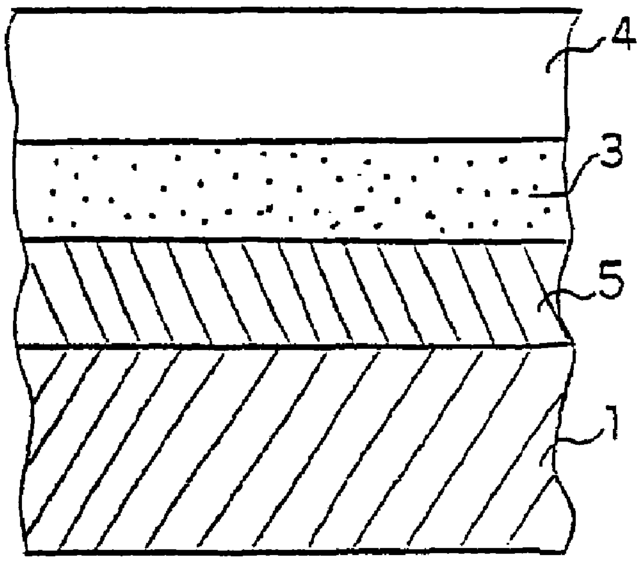
FIG. 2 is a view illustrating another resin-coated steel plate of the present invention.

Namely, as shown in FIG. 1, the resin-coated steel plate of the present invention comprises on at least one surface of the steel plate 1, an alloy layer 2 of iron and at least one metal selected from tin, zinc and nickel, a layer 3 treated with a silane coupling agent, and a thermoplastic polyester resin layer 4 in this order from the side of the steel plate, or a resin-coated steel plate of FIG. 2 comprising a tin-plated layer 5 instead of the tin alloy layer 2.

The resin-coated steel plate exhibits excellent workability and film adhesion even when it's thickness is reduced through a severe working in which a ratio of the height of the can and the can diameter (above formula (1)) and the plate thickness reduction ratio of the can wall (above formula (2)) are, $$\text{Height of can } (H)/\text{can diameter } (D) \geqq 1 \quad (1)$$

$$\{(\text{Initial plate thickness } (t_0) - \text{can wall thickness } (t))/\text{initial plate thickness } (t_0)\} \times 100 \geqq 20\% \quad (2)$$

or even when it is subjected to a severe working such as flanging or necking.

Therefore, the can obtained by press-molding the resin-coated steel plate features excellent corrosion resistance particularly after the working.

The TFS used as a metal blank of the resin-coated steel plate has a metal chromium layer and a chromium oxide hydrate layer formed on the steel plate exhibiting excellent adhesion to the resin coating and imparting corrosion resistance, resistance against rust and resistance against discoloration due to sulfide staining. According to the present invention, there are formed (i) an alloy layer or a tin-plated layer and (ii) a silane coupling agent-treated layer on the surface of the steel plate. Therefore, the resin-coated steel plate of the invention withstands even severe working exhibiting excellent adhesion to the resin coating, excellent corrosion resistance and excellent resistance against rust.

Namely, upon combining (i) the alloy layer or the tin-plated layer having excellent corrosion resistance and durability with (ii) the silane coupling agent-treated layer, it is allowed to improve adhesion of the thermoplastic polyester layer to the tin-plated layer or the alloy layer to impart workability that withstands severe working.

Further, the layer treated with the silane coupling agent itself contributes to improving the durability and resistance against water while suppressing gases from permeating toward the alloy layer or the tin-plated layer and, hence, suppressing the formation of an oxide film of the alloy layer or the formation of the tin oxide film of the tin-plated layer. This prevents a deterioration of adhesion of the thermoplastic polyester resin layer caused by the formation and growth of the oxide film.

[Alloy Layer]

The alloy layer formed as the lowermost layer on at least one surface of the steel plate contains iron and at least one or more metals selected from tin, zinc and nickel. Formation of the alloy layer on the steel plate improves the corrosion resistance of the steel plate itself, and its combination with the layer treated with the silane coupling agent improves the work adhesion properties and improves the corrosion resistance after the working.

In the present invention, it is important that the alloy component constituting the alloy layer together with iron contains tin, zinc or nickel. As will become obvious from Examples appearing later, when there is used cobalt or molybdenum other than the above components as the alloy component (Comparative Examples 7 and 8) or when there is formed no alloy layer (Comparative Example 9), the work adhesion properties become poor and, particularly, the adhesion becomes poor at the necking portion and the flanging portion where the degree of working is great, developing corrosion at the worked portions and without offering satisfactory corrosion resistance.

The alloy layer comprises iron and one or more metals selected from tin, zinc and nickel. In the alloy layer containing tin, it is desired that the content of tin is larger than 0.05 $g/m^2$ but is smaller than 1.5 $g/m^2$ and, particularly, not smaller than 0.1 $g/m^2$ but is smaller than 1.3 $g/m^2$. In the alloy layer containing zinc or nickel, it is desired that the content of zinc or nickel is larger than 0.03 g/m2 but is smaller than 1.8 g/m2 and, particularly, not smaller than 0.1 g/m2 but is smaller than 1.2 g/m2.

That is, when the contents of metals constituting the alloy layer together with iron lie within the above ranges, the resin-coated steel plate can be favorably subjected to a severe working where the ratio of the height of can to the can diameter (above formula 1) becomes not smaller than 1 and the plate thickness reduction ratio of the can wall (above formula 2) becomes not smaller than 20%. When the metal contents are not lying within the above ranges, the work adhesion properties become poor. In particular, corrosion occurs at the double seamed portion and at the necking portion that are subjected to severe working, and the corrosion resistance becomes inferior as will become obvious from Examples appearing later (Comparative Examples 1 to 6).

In the case of the alloy layer containing nickel and/or zinc in addition to iron and tin, the alloy layer becomes fine and, besides, the corrosion resistance is improved. Therefore, the content of tin may lie within the above range.

To form the alloy layer on the surface of the steel plate, for example, to form the tin-iron alloy layer, the steel plate is plated with a predetermined amount of tin followed by heating at a temperature not lower than the melting point of tin and, further, followed by cooling. To form the tin-iron-nickel alloy layer, the steel plate is plated with nickel and, further, with tin followed by heating at a temperature not lower than the melting point of tin and cooling. The tin-zinc-iron alloy layer can also be formed in the same manner.

[Tin-Plated Layer]

The tin-plated layer formed on at least one surface of the steel plate is the one which contains tin in an amount of not smaller than 0.5 g/$m^2$. By plating the steel plate with tin, the steel plate itself exhibits improved corrosion resistance. Upon being combined with the layer treated with the silane coupling agent, further, improved work adhesion properties is obtained and, besides, improved corrosion resistance is obtained after the working.

Figure 3:
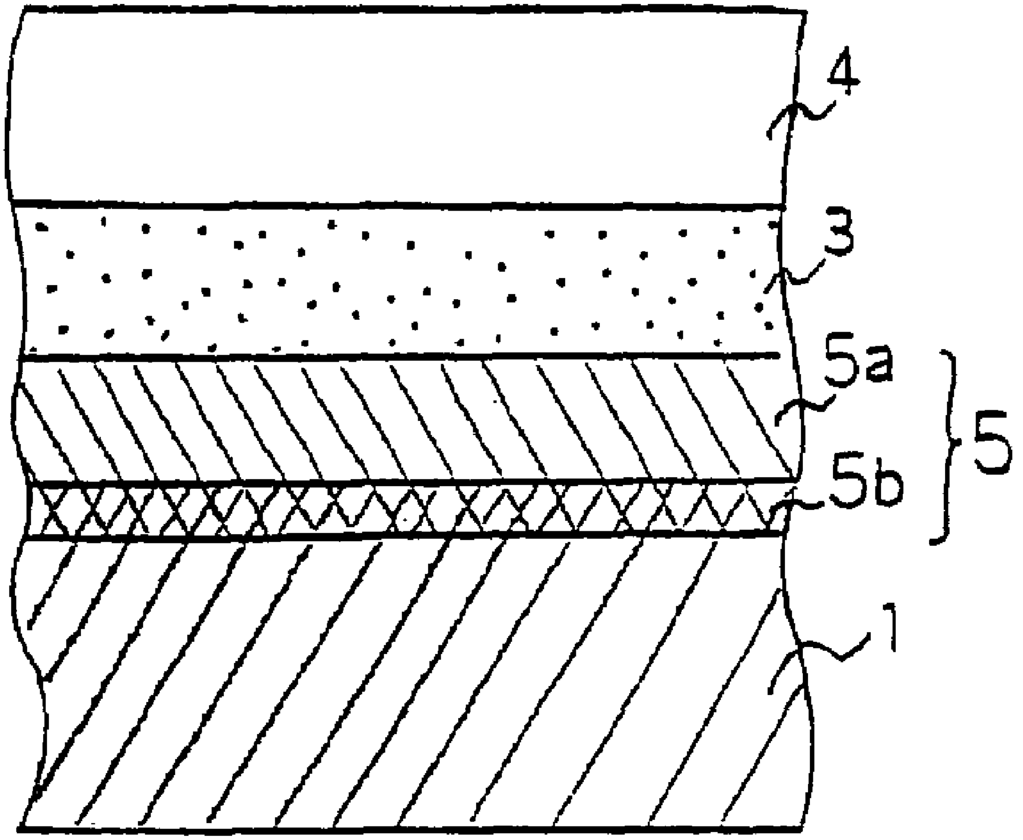
FIG. 3 is a view illustrating a further resin-coated steel plate of the present invention.

In the present invention as shown in FIG. 3, part of the tin-plated layer 5 on the steel plate 1 on the side of the steel plate may be a tin-iron alloy layer 5*b*; i.e., a two-layer constitution may be formed comprising the tin-plated layer 5*a* and the tin-iron alloy layer 5*b*.

To form the tin-plated layer as the two-layer constitution of tin-plated layer/tin-iron alloy layer, the steel plate is plated with a predetermined amount of tin followed by a reflow processing of conducting the heating at not lower than the melting point of tin and cooling, so that part of the tin-plated layer on the side of the steel plate is transformed into the iron-tin alloy layer. It is desired that the alloy contains 5 to 50% of tin that is contained in the tin-plated layer.

By forming the tin-iron alloy layer as described above, improved work adhesion properties are obtained and the steel plate itself exhibits improved corrosion resistance.

The tin-iron alloy layer in the tin-plated layer formed on the side of the steel plate may contain alloy components such as iron-tin-nickel or iron-tin-zinc in addition to tin-iron.

The thickness of the tin-plated layer is, as described above; i.e, the content of tin is not smaller than 0.5 g/$m^2$, preferably, 0.5 to 12 g/$m^2$ and, more preferably, 0.7 to 12 g/$m^2$.

That is, as will become obvious from the results of Examples appearing later, the resin-coated steel plate having a tin-plated layer of a thickness of not smaller than 0.5 mg/$m^2$ exhibits excellent work adhesion properties and excellent corrosion resistance. On the other hand, the resin-coated steel plate plated with tin in an amount of smaller than 0.5 mg/m2 exhibits poor work adhesion properties at the flanging portion and develops corrosion in part of the double seamed portion, without offering satisfactory corrosion resistance.

When the amount of tin exceeds the above range, the material of the can loses competitive power in economy through properties are not deteriorated.

Even when the tin-iron alloy layer is formed in a portion on the side of the steel plate through the reflow treatment, it is desired that the content of tin in the tin-plated layer formed on the steel plate prior to the reflow treatment lies within the above-mentioned range.

[Silane Coupling Agent-Treated Layer]

The silane coupling agent-treated layer formed on the alloy layer or the tin-plated layer works to improve the adhesion between the alloy layer or the tin-plated layer and the thermoplastic polyester resin layer owing to the reaction group possessed by the silane coupling agent. Further, the silane coupling agent-treated layer helps improve the durability and resistance against water while suppressing the permeation of gases toward the alloy layer or the tin-plated layer and, hence, suppressing the formation of an oxide film of the alloy layer or of the tin-plated layer. This prevents a drop in the adhesion to the resin layer caused by the formation and growth of the oxide film.

It is desired that the silane coupling agent-treated layer is so formed that the amount of Si is 0.8 to 18 mg/$m^2$ and, particularly, 1 to 15 mg/$m^2$. Namely, as demonstrated in Examples appearing later, when subjected to a severe working, the work adhesion properties become poor when the amount of Si is smaller than the above range as compared to when the amount of Si lies in the above range, and satisfactory corrosion resistance is not obtained (Comparative Examples 2 and 24). When the amount of Si is greater than the above range, the unreacted silane coupling agent undergoes the self-condensation making it difficult to obtain satisfactory work adhesion properties or satisfactory corrosion resistance (Comparative Examples 3 and 25).

The silane coupling agent for forming the silane coupling agent-treated layer possesses a reaction group that chemically bonds to the thermoplastic polyester resin and a reaction group that chemically bonds to the alloy layer or the tin-plated layer, and may comprise an organosilane having a reaction group such as amino group, epoxy group, methacryloxy group or mercapto group and a hydrolyzing alkoxyl group such as methoxy group or ethoxy group, or may comprise a silane having an organic substituent such as methyl group, phenyl group, epoxy group or mercapto group and a hydrolyzing alkoxyl group.

Concrete examples of the silane coupling agent that can be preferably used in the present invention include γ-aminopropyltrimethoxysilane (γ-APS), γ-glycidoxypropyltrimethoxysilane (γ-GPS), bistrimethoxysilylpropylaminosilane (BTSPA), and N-β(aminoethyl)γ-aminopropyltrimethoxysilane.

To form the silane coupling agent-treated layer on the alloy layer or on the tin-plated layer, the solution of the above-mentioned silane coupling agent is coated onto the alloy layer or onto the tin-plated layer, or the steel plate forming the alloy layer or the tin-plated layer is immersed in the solution of the silane coupling agent and, then, an excess of solution is removed by using squeeze rolls. A preferred combination of the silane coupling agent solutions and the order of treatment are as described below.

(1) A layer is formed by the treatment by using an amino group-containing silane solution and/or an epoxy group-containing silane coupling agent solution.

(2) A layer is formed by the treatment by using a mixed solution of a silane coupling agent containing an amino group and/or an epoxy group and a silane containing an organic substituent and a hydrolyzing alkoxyl group.

(3) A layer is formed by the treatment with a silane containing an organic substituent and a hydrolyzing alkoxyl group and, then, with a silane coupling agent solution comprising an amino group-containing silane solution and/or an epoxy group-containing silane solution.

[Thermoplastic Polyester Resin Layer]

In the present invention, the thermoplastic polyester resin layer formed on the silane coupling agent-treated layer to work as a protection film on the surface layer, little adsorbs fragrant components in the content and exhibits excellent barrier property against the corrosive components and excellent impact resistance.

Upon forming the thermoplastic polyester resin layer prior to molding a can, it is allowed to omit a step of coating for forming the protection film after the molding without accompanied by such problems as worsened working environment due to the organic solvent used for the coating and the disposal of the waste solution.

The polyester resin forming the thermoplastic polyester resin layer can be a widely known polyester resin derived from a carboxylic acid component and an alcohol component, and may be a homopolyester, a copolymerized polyester, or a blend of two or more kinds thereof.

As the carboxylic acid component, there can be used terephthalic acid, isophthalic acid, naphthalenedicarboxylic acid, P-β-oxyethoxybenzoic acid, biphenyl-4,4'-dicarboxylic acid, diphenoxyethane-4,4'-dicarboxylic acid, 5-sodiumsulfoisophthalic acid, hexahydroterephthalic acid, adipic acid, sebacic acid, trimellitic acid, and pyromellitic acid, As the alcohol component, further, there can be exemplified ethylene glycol, 1,4-butanediol, propylene glycol, neopentyl glycol, 1,6-hexylene glycol, diethylene glycol, triethylene glycol, cyclohexane dimethanol, glycerol, trimethylolpropane, pentaerythritol, dipentaerythritol and sorbitan.

Among the known thermoplastic polyester resins according to the present invention, it is particularly desired to use a polyethylene terephthalate type copolymer resin, i.e., an ethylene terephthalate type copolymerized polyester resin in which not less than 50 mol % of the carboxylic acid component is a terephthalic acid, and not less than 50 mol % of the alcohol component is an ethylene glycol component. Desirably, there can be used a polyethylene terephthalate/isophthalate containing 3 to 18 mol % of isophthalic acid as a carboxylic acid component.

When the surface of the steel plate has been plated with a layer of tin in an amount of not smaller than 0.5 $g/m^2$, it is desired that the copolymerizing ratio is such that the melting point of the polyester resin is not higher than the melting point (232° C.) of tin. This enables the tin-plated steel plate to be coated with the polyester resin by heat-melt-adhesion at a temperature of not higher than the melting point of tin to maintain excellent adhesion between the tin-plated steel plate and the polyester resin. In the case of, for example, a polyethylene terephthalate/isophthalate copolymerized resin, the amount of the isophthalic acid component is adjusted to lie in a range of 11 to 18% to lower the melting point of the polyester resin to be not higher than 232° C.

By blending the polyester resin with an ionomer resin, further, it is allowed to improve press workability and adhesion to the tin-plated steel plate.

As the α,β-unsaturated carboxylic acid for forming a base polymer of the ionomer resin, there can be used unsaturated carboxylic acid having 3 to 8 carbon atoms, such as acrylic acid, methacrylic acid, maleic acid, itaconic acid, maleic anhydride, monomethyl maleate and monomethyl maleate ester. Particularly preferably, there can be used an ethylene/(meth)acrylic acid copolymer.

The amount of neutralization is, usually, 15 to 100% and, particularly, 20 to 80%. The kind of metal used for the neutralization is preferably zinc. The remaining position of carboxyl group not neutralized with the above kind of metal may be esterified with a lower alcohol.

It is desired that the ionomer resin has a melt flow rate of 0.1 to 50 g/10 min. and, particularly, 0.3 to 20 g/10 min.

It is further desired that the polyester resin that is used has a molecular weight large enough for forming a film and has an inherent viscosity [η] as measured in the ortho-chlorophenol at 25° C. of 0.6 to 1.2.

In the resin-coated steel plate used in the invention, it is desired that the thermoplastic polyester resin layer has a thickness in a range of 8 to 42 μm and, particularly, 10 to 40 μm from the standpoint of balance between protecting the steel plate on which the alloy layer or the tin-plated layer is formed and the workability. When the thickness of the thermoplastic polyester resin layer is smaller than the above range, the resin layer loses barrier property due to the reduced thickness, corrosion occurs due to the permeation of the content, cracks occur in the resin layer during the working for reducing the thickness, and the corrosion tend to occur at an increased probability (Comparative Examples 16 and 30). Further, when the thickness becomes greater than the above range, the resin layer itself exhibits increased rigidity, and the work adhesion properties become poor in the portions subjected to the severe working such as necking portion or double seamed portion (Comparative Examples 17 and 31).

Any known means can be employed, such as extrusion coating method, cast film heat-adhesion method or film heat-adhesion method for forming the thermoplastic polyester resin layer on the steel plate on which there have been formed the alloy layer or the tin-plated layer and the silane coupling agent-treated layer.

When the polyester film is used, the film is obtained by a T-die method or an inflation film-forming method. Desirably, the film is an undrawn film formed by the cast-molding method by quickly cooling the extruded film, since the film is free of distortion yet having excellent workability and adhesion. It is further allowable to use a biaxially stretched film produced by biaxially drawing the film at a drawing temperature successively or simultaneously and heat-setting the film after it has been drawn.

In the present invention as described above, it is allowable to use either the non-oriented film or the biaxially oriented polyester film. When a tin layer is to be plated on the steel plate, however, it is desired to use the non-oriented polyester film.

Namely, use of the non-oriented (amorphous) polyester film makes it possible to obtain a laminate having a sufficiently large adhering force at a temperature lower than the melting point of the tin-plated layer, suppressing the damage in the silane coupling agent-treated layer caused by heating, and making it possible to accomplish excellent work adhesion properties and corrosion resistance without impairing the effect of the treatment with the silane coupling agent.

[Steel Plate]

The steel plate used in the present invention may be a widely known cold rolled steel plate that has heretofore been used for producing cans, and has a plate thickness of about 0.1 to about 0.4 mm.

[Layer Constitution of the Resin-Coated Steel Plate]

As described above, the resin-coated steel plate used in the present invention has the alloy layer or the tin-plated layer, the silane coupling agent-treated layer and the thermoplastic polyester resin layer that are formed in this order on at least one surface of the steel plate. As required, however, there can be formed other layers. Namely, there can be formed the alloy layer or the tin-plated layer, the silane coupling agent-treated layer and the thermoplastic polyester resin layer, as well as a white coated layer and a printed layer on the thermoplastic polyester resin layer on the surface of the steel plate that becomes the outer surface of the can like on the inner surface side.

(Press-Formed Can)

To press-mold a can according to the invention, the above resin-coated steel plate having (i) an alloy layer or a tin-plated layer, (ii) a silane coupling agent-treated layer and (iii) a thermoplastic polyester resin layer formed on the inner surface thereof, is subjected to the known press working such as drawing, draw and redrawing, draw and wall ironing, draw and stretching, or draw and stretching and ironing (stretch-ironing) and, further, to the doming, trimming, flanging and necking, to obtain a two-piece can or a one-piece can without seam on the side surface.

The resin-coated steel plate of the present invention exhibits its particularly excellent effects when it is attempted to obtain a press-formed can having a reduced thickness through such a severe working that the ratio of height (H) of can/can width (D) is in a range of not smaller than 1 and, particularly, 1.1 to 3.0 and that the average plate thickness reduction ratio of the can wall {(initial plate thickness ($t_9$)−can wall plate thickness (t))/initial plate thickness ($t_0$)}×100 is not smaller than 20% and, particularly, 25 to 70%.

In producing the press can of the present invention, the thermoplastic polyester resin layer on the surface imparts a sufficient degree of lubricating property. To further enhance the lubricating property, however, a lubricant such as various oils and fats or waxes may be applied in small amounts to carry out the working on the lubricating solid surface.

EXAMPLES

The evaluation and the testing were as described below throughout Examples and Comparative Examples.

1. Work Adhesion Property.

A wax-type lubricant was applied onto both surfaces of the resin-coated steel plate, and a disk of a diameter of 155 mm was punched by press to obtain a shallow-draw-formed cup. The shallow-draw-formed cup was then subjected to the stretch ironing working to obtain a cup having a cup diameter of 66 mm, a cup height of 128 mm and an average plate thickness reduction ratio of the can wall portion of 55%. The cup was subjected to the doming according to an ordinary method, heat-treated at 215° C., and was, then, left to cool, followed by the trimming of the open edge portion, printing on the curved surface, baking and drying, necking and flanging to obtain a can of a reduced thickness having a capacity of 350 g. The can was observed by eyes for its state of adhesion of the metal blank and the resin film on the inner and outer surfaces of the can at the can wall portion, necking portion, and flanging portion, and was evaluated as follows:

○: No delamination.

Δ: Delamination area is smaller than 1 $mm^2$.

X: Delamination area is not smaller than 1 $mm^2$.

Good work adhesion means that "the organic resin coating does not peel off the surface-treated steel plate during the working". Poor work adhesion refers to the phenomenon wherein the adhering force decreases between the organic resin and the surface-treated steel plate during the working, and the organic resin peels off. Even if the organic resin coating does not peel off, it can be said that the work adhesion is good if it withstands a severe degree of working (i.e., if it withstands a severe reduction of thickness of the can wall plate).

2. Exposure of Metal after the Can has been Molded.

The can after having been molded was filled with an aqueous solution containing 1% of sodium chloride, and an electric current flowing across the electrode and the can was measured by using an enamel rater and was regarded to be the exposure of a metal.

3. Evaluation of Testing of the Can.

The can that has been molded was filled with 350 g of coke and was double seamed with an aluminum closure. The can was stored at 37° C. for 6 months.

Amount of Dissolved Iron.

The amount of iron in the content after preserved and the amount of iron in the content before filled were measured by the atomic absorption method, and a difference therebetween was regarded to be the amount of elution of iron. The number of samples was 24 cans, and an arithmetic average value of 24 cans was used.

Inner Surface State of the Can.

After preserved, the content was removed, and the inner surface of the can was washed with water to observe the corroding state on the inner surface of the can and the discolored state by eyes and by using a microscope.

Example 1

A tin-plated layer was formed on both surfaces of a cold rolled steel plate having a thickness of 0.18 mm and a tempering degree of DR7 by depositing tin in an amount of 0.1 $g/m^2$ on each surface, followed by a reflow treatment to transform all metal tin into an iron-tin alloy layer. The steel plate was then immersed in an aqueous solution containing 3% of γ-APS (γ-aminopropyltrimethoxysilane), and an excess of the γ-APS solution was readily squeezed off by using squeeze rolls to obtain a surface-treated steel plate having a silane coupling agent-treated layer containing Si in an amount of 5 $mg/m^2$. Next, the surface-treated steel plate was heated at a temperature higher than a melting point of the film by 10° C. to heat-laminate a copolymerized polyester (m.p., 228° C.) cast film comprising copolymerized polyester (terephthalic acid/isophthalic acid (weight ratio of 88/12) and an ethylene glycol maintaining a thickness of 20 μm on both surfaces at a laminate roll temperature of 150° C. and a passing speed of 150 m/min., immediately followed by cooling with water to obtain a resin-coated steel plate. A wax-type lubricant was applied onto both surfaces of the resin-coated steel plate, and a disk of a diameter of 155 mm was punched by press to obtain a shallow drawn cup. Next, the shallow drawn cup was subjected to the stretch ironing to obtain a stretch-ironed cup having a cup diameter of 66 mm, a cup height of 128 mm and an average plate thickness reduction ratio of the can wall of 55%. The cup was subjected to the doming according to an ordinary method, heat-treated at 215° C., and was, then, left to cool, followed by the trimming of the open edge portion, printing on the curved surface, baking and drying, necking and flanging to obtain a can of a reduced thickness having a capacity of 350 g.

Next, the can was filled with coke, and was double seamed with an end. After preserved, the inner surface state of the can was examined.

Table 1 shows compositions of the alloy layers of the resin-coated steel plates, amounts of tin and other metals in the alloy layers, kinds of the surface treatment, thickness of treatment, kinds and thickness of organic coating materials, and Table 2 shows the evaluated results of the test of the cans.

Examples 2 to 6, Comparative Examples 1 and 2

Resin-coated steel plates were prepared and cans were produced in the same manner as in Example 1 but varying the amount of tin in the alloy layers as represented by the amounts in Table 1, to evaluate them. The results were as shown in Table 2.

Example 7

A resin-coated steel plate was prepared and a can was produced in the same manner as in Example 1 but plating nickel in an amount of 0.3 $g/m^2$ on each surface prior to plating tin, and plating tin in an amount of 0.6 $g/m^2$ on each surface to evaluate them. The results were as shown in Table 2.

Example 8

A resin-coated steel plate was prepared and a can was produced in the same manner as in Example 1 but plating zinc in an amount of 0.3 $g/m^2$ on each surface prior to plating tin, and plating tin in an amount of 0.6 $g/m^2$ on each surface to evaluate them. The results were as shown in Table 2.

Examples 9 to 13, Comparative Examples 3 and 4

Resin-coated steel plates were prepared and cans were produced in the same manner as in Example 1 but plating an iron-nickel alloy layer containing nickel in amounts as shown in Table 1 instead of plating tin, to evaluate them. The results were as shown in Table 2.

Examples 14 to 18, Comparative Examples 5 and 6

Resin-coated steel plates were prepared and cans were produced in the same manner as in Example 1 but plating zinc in amounts as shown in Table 1 instead of plating tin, and plating an iron-zinc alloy layer by the reflow treatment, to evaluate them. The results were as shown in Table 2.

Comparative Example 7

A resin-coated steel plate was prepared and a can was produced in the same manner as in Example 1 but plating an iron-cobalt alloy containing cobalt in an amount of 0.8 $mg/m^2$ instead of plating tin, to evaluate them. The results were as shown in Table 2.

Comparative Example 8

A resin-coated steel plate was prepared and a can was produced in the same manner as in Example 1 but plating an iron-molybdenum alloy containing molybdenum in an amount of 0.8 $mg/m^2$ instead of plating tin, to evaluate them. The results were as shown in Table 2.

Comparative Example 9

A resin-coated steel plate was prepared and a can was produced in the same manner as in Example 1 but plating a tin layer on both surfaces by depositing tin in an amount of 0.1 $g/m^2$ on each surface, and omitting the reflow treatment so as not to form the iron-tin alloy layer, to evaluate them. The results were as shown in Table 2.

Examples 19 to 21, Comparative Examples 10 and 11

Resin-coated steel plates were prepared and cans were produced in the same manner as in Example 1 but selecting the amount of tin in the alloy layers to be 0.6 $g/m^2$ and selecting the thickness of the surface treatment to be as shown in Table 1 in terms of the Si amount, to evaluate them. The results were as shown in Table 2.

Example 22

A resin-coated steel plate was prepared and a can was produced in the same manner as in Example 1 but treating the surface on the tin-iron alloy layer with a 3% of γ-GPS (γ-glycidoxypropyltrimethoxysilane) water ethanol solution instead of using a γ-APS aqueous solution and forming a film by the treatment containing Si in an amount of 5 $mg/m^2$, to evaluate them. The results were as shown in Table 2.

Example 23

A resin-coated steel plate was prepared and a can was produced in the same manner as in Example 1 but treating the surface on the tin-iron alloy layer with a 3% of BTSE (bis-1,2-(triethoxysilyl)ethane) water ethanol solution instead of using a γ-APS aqueous solution, followed by the treatment with a 3% of γ-APS aqueous solution, and forming a film by the treatment containing Si in a total amount of 10 $mg/m^2$, to evaluate them. The results were as shown in Table 2.

Example 24

A resin-coated steel plate was prepared and a can was produced in the same manner as in Example 1 but treating the surface on the tin-iron alloy layer with a water ethanol solution of a mixture of 3% of BTSPS (bistrimethoxysilylpropyltetra sulfide) and 3% of γ-APS instead of using a γ-APS aqueous solution, and forming a film by the treatment containing Si in an amount of 10 $mg/m^2$, to evaluate them. The results were as shown in Table 2.

Comparative Example 12

A resin-coated steel plate was prepared and a can was produced in the same manner as in Example 1 but treating the surface on the tin-iron alloy layer with a 3% tetraethoxysilane solution instead of using a γ-APS aqueous solution and forming a film by the treatment containing Si in an amount of 5 $mg/m^2$, to evaluate them. The results were as shown in Table 2.

Comparative Example 13

A resin-coated steel plate was prepared and a can was produced in the same manner as in Example 1 but treating the surface on the tin-iron alloy layer with a 3% BTSE (bis-1,2-(triethoxysilyl)ethane) water ethanol solution instead of using a γ-APS aqueous solution, and forming a film by the treatment containing Si in an amount of 5 $mg/m^2$, to evaluate them. The results were as shown in Table 2.

Comparative Example 14

A resin-coated steel plate was prepared and a can was produced in the same manner as in Example 1 but subjecting the surface on the tin-iron alloy layer to the electrolytic phosphoric acid treatment instead of the treatment with the γ-APS aqueous solution and forming a film by the treatment containing P in an amount of 2.5 $mg/m^2$, to evaluate them. The results were as shown in Table 2.

Comparative Example 15

A resin-coated steel plate was prepared and a can was produced in the same manner as in Example 1 but treating the surface on the tin-iron alloy layer with tin phosphate instead of using a γ-APS aqueous solution, and forming a film by the treatment containing P in an amount of 2.5 $mg/m^2$ and Sn in an amount of 2.5 $mg/m^2$, to evaluate them. The results were as shown in Table 2.

Examples 25 and 26, Comparative Examples 16 and 17

Resin-coated steel plates were prepared and cans were produced in the same manner as in Example 1 but using an N-β(aminoethyl)γ-aminopropyltrimethoxysilane as the silane coupling agent, forming a film by the treatment containing Si in an amount of 7 mg/$m^2$, and selecting the thickness of the copolymerized polyester film which is an organic coating material as shown in Table 1, to evaluate them. The results were as shown in Table 2.

Examples 27 and 28

Resin-coated steel plates were prepared and cans were produced in the same manner as in Example 25 but changing the kinds and thickness of the polyester film which is the organic coating material as shown in Table 1, to evaluate them. The results were as shown in Table 2.

Comparative Example 18

A resin-coated steel plate was prepared and a can was produced in the same manner as in Example 25 but using a polypropylene film of a thickness of 25 μm as the organic coating material instead of using the copolmerized polyester film, and laminating the films by using an urethane-type adhesive, to evaluate them. The results were as shown in Table 2.

Comparative Example 19

A resin-coated steel plate was prepared and a can was produced in the same manner as in Example 25 but using a polyethylene film of a thickness of 25 μm as the organic coating material instead of using the copolmerized polyester film, and laminating the films by using an urethane-type adhesive, to evaluate them. The results were as shown in Table 2.

Comparative Example 20

A resin-coated steel plate was prepared and a can was produced in the same manner as in Example 25 but using an epoxyacrylic coating material which is an organic coating material instead of using the copolymerized polyester film, roll-coating the coating material in such an amount that the thickness after baking was 10 μm and baking the coating material at 200° C. for 10 minutes, to evaluate them. The results were as shown in Table 2.

Comparative Example 21

A resin-coated steel plate was prepared and a can was produced in the same manner as in Example 25 but using an epoxyphenol-type coating material which is an organic coating material instead of using the copolymerized polyester film, roll-coating the coating material in such an amount that the thickness after baking was 10 μm and baking the coating material at 200° C. for 10 minutes, to evaluate them. The results were as shown in Table 2.

Comparative Example 22

A resin-coated steel plate was prepared and a can was produced in the same manner as in Example 25 but using a vinylorganosol-type coating material which is an organic coating material instead of using the copolymerized polyester film, roll-coating the coating material in such an amount that the thickness after baking was 15 μm and baking the coating material at 200° C. for 10 minutes, to evaluate them. The results were as shown in Table 2.

Example 29

A tin-plated layer was formed on both surfaces of a cold rolled steel plate having a thickness of 0.18 mm and a tempering degree of DR7 by depositing tin in an amount of 0.5 g/$m^2$ on each surface. The steel plate was then immersed in an aqueous solution containing 3% of γ-APS (γ-aminopropyltrimethoxysilane), and an excess of the γ-APS solution was readily squeezed off by using squeeze rolls to obtain a surface-treated steel plate having a silane coupling agent-treated layer containing Si in an amount of 5 mg/$m^2$. Next, the surface-treated steel plate was heated at 225° C. which was lower than the melting point of tin by 7° C. to heat-laminate a copolymerized polyester (m.p., 228° C.) cast film comprising copolymerized polyester (terephthalic acid/isophthalic acid (weight ratio of 88/12) and an ethylene glycol maintaining a thickness of 20 μm on both surfaces at a laminate roll temperature of 150° C. and a passing speed of 150 m/min., immediately followed by cooling with water to obtain a resin-coated steel plate. A wax-type lubricant was applied onto both surfaces of the resin-coated steel plate, and a disk of a diameter of 155 mm was punched by press to obtain a shallow-draw-formed cup. Next, the shallow-draw-formed cup was subjected to the stretch ironing to obtain a cup having a cup diameter of 66 mm, a cup height of 128 mm and an average plate thickness reduction ratio of the can wall of 55%. The cup was subjected to the doming according to an ordinary method, heat-treated at 215° C., and was, then, left to cool, followed by the trimming of the open edge portion, printing on the curved surface, baking and drying, necking and flanging to obtain a can of a reduced thickness having a capacity of 350 g. Next, the can was filled with coke, and was double seamed with an end. After preserved, the inner surface state of the can was examined.

Table 3 shows the amounts of tin plated on the resin-coated steel plates, presence of reflow treatment, kinds of the surface treatment, thickness of treatment, kinds and thickness of organic coating materials, and Table 4 shows the evaluated results of the test of the cans.

Examples 30 to 33

Resin-coated steel plates were prepared and cans were produced in the same manner as in Example 29 but varying the amount of tin plated on each surface as represented by the amounts shown in Table 1 and transforming part of the metal tin layer on the side of the steel plate into an iron-tin alloy layer by the reflow treatment, to evaluate them. The results were as shown in Table 4.

Example 34, Comparative Example 23

Resin-coated steel plates were prepared and cans were produced in the same manner as in Example 29 but changing the amounts of tin plated on each surface as represented by the amounts shown in Table 3 to evaluate them. The results were as shown in Table 4.

Examples 35, 36 and 37, Comparative Examples 24 and 25

Resin-coated steel plates were prepared and cans were produced in the same manner as in Example 29 but forming the silane coupling agent-treated layers containing Si in amounts as shown in Table 3 to evaluate them. The results were as shown in Table 4.

Example 38

A resin-coated steel plate was prepared and a can was produced in the same manner as in Example 29 but treating the surface on the tin layer with a 3% γ-GPS (γ-glycidoxypropyltrimethoxysilane) water ethanol solution instead of using a γ-APS aqueous solution to evaluate them. The results were as shown in Table 4.

Example 39

A resin-coated steel plate was prepared and a can was produced in the same manner as in Example 29 but treating the surface on the tin layer with a 3% BTSE (bis-1,2-(triethoxysilyl)ethane) water ethanol solution instead of using a γ-APS aqueous solution, followed by the treatment with a 3% γ-APS aqueous solution, and forming a film by the treatment containing Si in a total amount of 10 mg/m2, to evaluate them. The results were as shown in Table 4.

Example 40

A resin-coated steel plate was prepared and a can was produced in the same manner as in Example 29 but treating the surface on the tin layer with a water ethanol solution of a mixture of 3% BTSPS (bistrimethoxysilylpropyltetra sulfide) and 3% APS instead of using a γ-APS aqueous solution, and forming a film by the treatment containing Si in an amount of 10 $mg/m^2$, to evaluate them. The results were as shown in Table 4.

Comparative Example 26

A resin-coated steel plate was prepared and a can was produced in the same manner as in Example 29 but treating the surface on the tin layer with a 3% tetraethoxysilane solution instead of using a γ-APS aqueous solution and forming a film by the treatment containing Si in an amount of 5 $mg/m^2$, to evaluate them. The results were as shown in Table 4.

Comparative Example 27

A resin-coated steel plate was prepared and a can was produced in the same manner as in Example 29 but treating the surface on the tin layer with a water ethanol solution of 3% BTSE (bis-1,2-(triethoxysilyl)ethane) instead of using a γ-APS aqueous solution, and forming a film by the treatment containing Si in an amount of 5 $mg/m^2$, to evaluate them. The results were as shown in Table 4.

Comparative Example 28

A resin-coated steel plate was prepared and a can was produced in the same manner as in Example 29 but subjecting the surface on the tin layer to the electrolytic phosphoric acid treatment instead of the treatment with the γ-APS aqueous solution and forming a film by the treatment containing P in an amount of 2.5 $mg/m^2$, to evaluate them. The results were as shown in Table 4.

Comparative Example 29

A resin-coated steel plate was prepared and a can was produced in the same manner as in Example 29 but subjecting the surface on the tin layer to the treatment with tin phosphate instead of the treatment with the γ-APS aqueous solution and forming a film by the treatment containing P in an amount of 2.5 $mg/m^2$ and Sn in an amount of 2.5 $mg/m^2$, to evaluate them. The results were as shown in Table 4.

Examples 41 and 42, Comparative Examples 30 and 31

Resin-coated steel plates were prepared and cans were produced in the same manner as in Example 29 but using an N-β(aminoethyl)γ-aminopropyltrimethoxysilane as a silane coupling agent, forming a film by the treatment containing Si in an amount of 7 $mg/m^2$ and selecting the thickness of the copolymerized polyester film which is an organic coating material to be as shown in Table 3, to evaluate them. The results were as shown in Table 4.

Example 43

A resin-coated steel plate was prepared and a can was produced in the same manner as in Example 41 but selecting the kind and thickness of the polyester film which is the organic coating material as shown in Table 3, to evaluate them. The results were as shown in Table 4.

Example 44

A resin-coated steel plate was prepared and a can was produced in the same manner as in Example 41 but using an undrawn homo PET (polyethylene terephthalate) film having a thickness of 25 μm as an organic coating material, to evaluate them. The results were as shown in Table 4.

Example 45

A resin-coated steel plate was prepared and a can was produced in the same manner as in Example 41 but selecting the kind and thickness of the biaxially drawn homo PET (polyethylene terephthalate) having a thickness of 25 μm as an organic coating material, to evaluate them. The results were as shown in Table 4.

Comparative Example 32

A resin-coated steel plate was prepared and a can was produced in the same manner as in Example 41 but using a polypropylene film having a thickness of 25 μm as an organic coating material instead of using the copolymerized polyester film and laminating the films by using an urethane-type adhesive, to evaluate them. The results were as shown in Table 4.

Comparative Example 33

A resin-coated steel plate was prepared and a can was produced in the same manner as in Example 41 but using a polyethylene film having a thickness of 25 μm as an organic coating material instead of using the copolymerized polyester film and laminating the films by using an urethane-type adhesive, to evaluate them. The results were as shown in Table 4.

Comparative Example 34

A resin-coated steel plate was prepared and a can was produced in the same manner as in Example 41 but using an epoxyacrylic coating material as an organic coating material instead of the copolymerized polyester film, roll-coating the coating material in such an amount that the thickness after baking was 10 μm and baking the coating material at 200° C. for 10 minutes, to evaluate them. The results were as shown in Table 4.

Comparative Example 35

A resin-coated steel plate was prepared and a can was produced in the same manner as in Example 41 but using an epoxyphenol-type coating material as an organic coating material instead of the copolymerized polyester film, roll-coating the coating material in such an amount that the thickness after baking was 10 μm and baking the coating material at 200° C. for 10 minutes, to evaluate them. The results were as shown in Table 4.

Comparative Example 36

A resin-coated steel plate was prepared and a can was produced in the same manner as in Example 41 but using a vinylorganosol-type coating material as an organic coating material instead of the copolymerized polyester film, roll-coating the coating material in such an amount that the thickness after baking was 15 μm and baking the coating material at 200° C. for 10 minutes, to evaluate them. The results were as shown in Table 4.

Example 46

A resin-coated steel plate was prepared and a can was produced in the same manner as in Example 29 but plating tin on both surfaces while varying the amount of tin plated on each surface as represented by the amounts shown in Table 3, transforming part of the metal tin layer on the side of the steel plate into an iron-tin alloy layer by the reflow treatment, and laminating, on both surfaces, a polyester resin of a kind which was obtained by blending a polyethylene terephthalate/isophthalate (weight ratio, 88/12) and a Zn-type ionomer resin at a weight ratio of 85:15, to evaluate them. The results were as shown in Table 4.

Example 47

A resin-coated steel plate was prepared and a can was produced in the same manner as in Example 46 but using the polyester resin of a kind obtained by blending a polyethylene terephthalate/isophthalate (weight ratio, 88/12) and a Zn-type ionomer resin at a weight ratio of 92:8, to evaluate them. The results were as shown in Table 4.

TABLE 1

| | Alloy layer | | Surface treatment | | Organic coating material | |
|---|---|---|---|---|---|---|
| Sample | Composition | Amount of metal (g/m$^2$) | Kind | Treating thickness (mg/m$^2$) | Kind | Thickness (μm) |
| Ex. 1 | Sn—Fe | Sn 0.1 | γ-APS[1] | Si, 5 | PET/IA(12%)[5] | 20 |
| Ex. 2 | Sn—Fe | Sn 0.3 | γ-APS[1] | Si, 5 | PET/IA(12%)[5] | 20 |
| Ex. 3 | Sn—Fe | Sn 0.5 | γ-APS[1] | Si, 5 | PET/IA(12%)[5] | 20 |
| Ex. 4 | Sn—Fe | Sn 0.8 | γ-APS[1] | Si, 5 | PET/IA(12%)[5] | 20 |
| Ex. 5 | Sn—Fe | Sn 1.0 | γ-APS[1] | Si, 5 | PET/IA(12%)[5] | 20 |
| Ex. 6 | Sn—Fe | Sn 1.3 | γ-APS[1] | Si, 5 | PET/IA(12%)[5] | 20 |
| Comp. Ex. 1 | Sn—Fe | Sn 0.05 | γ-APS[1] | Si, 5 | PET/IA(12%)[5] | 20 |
| Comp. Ex. 2 | Sn—Fe | Sn 1.5 | γ-APS[1] | Si, 5 | PET/IA(12%)[5] | 20 |
| Ex. 7 | Sn—Fe—Ni | Sn 0.6 | γ-APS[1] | Si, 5 | PET/IA(12%)[5] | 20 |
| Ex. 8 | Sn—Fe—Zn | Sn 0.6 | γ-APS[1] | Si, 5 | PET/IA(12%)[5] | 20 |
| Ex. 9 | Fe—Ni | Ni 0.08 | γ-APS[1] | Si, 5 | PET/IA(12%)[5] | 20 |
| Ex. 10 | Fe—Ni | Ni 0.1 | γ-APS[1] | Si, 5 | PET/IA(12%)[5] | 20 |
| Ex. 11 | Fe—Ni | Ni 0.8 | γ-APS[1] | Si, 5 | PET/IA(12%)[5] | 20 |
| Ex. 12 | Fe—Ni | Ni 1.2 | γ-APS[1] | Si, 5 | PET/IA(12%)[5] | 20 |
| Ex. 13 | Fe—Ni | Ni 1.5 | γ-APS[1] | Si, 5 | PET/IA(12%)[5] | 20 |
| Comp. Ex. 3 | Fe—Ni | Ni 0.03 | γ-APS[1] | Si, 5 | PET/IA(12%)[5] | 20 |
| Comp. Ex. 4 | Fe—Ni | Ni 1.8 | γ-APS[1] | Si, 5 | PET/IA(12%)[5] | 20 |
| Ex. 14 | Fe—Zn | Zn 0.08 | γ-APS[1] | Si, 5 | PET/IA(12%)[5] | 20 |
| Ex. 15 | Fe—Zn | Zn 0.1 | γ-APS[1] | Si, 5 | PET/IA(12%)[5] | 20 |
| Ex. 16 | Fe—Zn | Zn 0.8 | γ-APS[1] | Si, 5 | PET/IA(12%)[5] | 20 |
| Ex. 17 | Fe—Zn | Zn 1.2 | γ-APS[1] | Si, 5 | PET/IA(12%)[5] | 20 |
| Ex. 18 | Fe—Zn | Zn 1.5 | γ-APS[1] | Si, 5 | PET/IA(12%)[5] | 20 |
| Comp. Ex. 5 | Fe—Zn | Zn 0.03 | γ-APS[1] | Si, 5 | PET/IA(12%)[5] | 20 |
| Comp. Ex. 6 | Fe—Zn | Zn 1.8 | γ-APS[1] | Si, 5 | PET/IA(12%)[5] | 20 |
| Comp. Ex. 7 | Fe—Co | Co 0.8 | γ-APS[1] | Si, 5 | PET/IA(12%)[5] | 20 |
| Comp. Ex. 8 | Fe—Mo | Mo 0.8 | γ-APS[1] | Si, 5 | PET/IA(12%)[5] | 20 |
| Comp. Ex. 9 | — | — | γ-APS[1] | Si, 5 | PET/IA(12%)[5] | 20 |
| Ex. 19 | Sn—Fe | Sn0.6 | γ-APS[1] | Si, 1 | PET/IA(12%)[5] | 20 |
| Ex. 20 | Sn—Fe | 0.6 | γ-APS[1] | Si, 3 | PET/IA(12%)[5] | 20 |
| Ex. 21 | Sn—Fe | 0.6 | γ-APS[1] | Si, 15 | PET/IA(12%)[5] | 20 |
| Comp. Ex. 10 | Sn—Fe | 0.6 | γ-APS[1] | Si, 0.5 | PET/IA(12%)[5] | 20 |
| Comp. Ex. 11 | Sn—Fe | 0.6 | γ-APS[1] | Si, 20 | PET/IA(12%)[5] | 20 |
| Ex. 22 | Sn—Fe | 0.6 | γ-GPS[2] | Si, 5 | PET/IA(12%)[5] | 20 |
| Ex. 23 | Sn—Fe | 0.6 | BTSE[3] → γ-APS 2-step treatment | Si, 10 | PET/IA(12%)[5] | 20 |
| Ex. 24 | Sn—Fe | 0.6 | mixed solution of BTSPS[4], γ-APS | Si, 10 | PET/IA(12%)[5] | 20 |
| Comp. Ex. 12 | Sn—Fe | 0.6 | tetraethoxysilane | Si, 5 | PET/IA(12%)[5] | 20 |
| Comp. Ex. 13 | Sn—Fe | 0.6 | BTSE[3] | Si, 5 | PET/IA(12%)[5] | 20 |
| Comp. Ex. 14 | Sn—Fe | 0.6 | phosphoric acid | P, 2.5 | PET/IA(12%)[5] | 20 |
| Comp. Ex. 15 | Sn—Fe | 0.6 | tin phosphate | P, 2.5<br>Sn, 2.5 | PET/IA(12%)[5] | 20 |

TABLE 1-continued

| | Alloy layer | | Surface treatment | | Organic coating material | |
|---|---|---|---|---|---|---|
| Sample | Composition | Amount of metal (g/m$^2$) | Kind | Treating thickness (mg/m$^2$) | Kind | Thickness (μm) |
| Ex. 25 | Sn—Fe | 0.8 | N-β (aminoethyl) γ-APS[7)] | Si, 7 | PET/IA(12%)[5)] | 10 |
| Ex. 26 | Sn—Fe | 0.8 | N-β (aminoethyl) γ-APS[7)] | Si, 7 | PET/IA(12%)[5)] | 40 |
| Comp. Ex. 16 | Sn—Fe | 0.8 | N-β (aminoethyl) γ-APS[7)] | Si, 7 | PET/IA(12%)[5)] | 7 |
| Comp. Ex. 17 | Sn—Fe | 0.8 | N-β (aminoethyl) γ-APS[7)] | Si, 7 | PET/IA(12%)[5)] | 45 |
| Ex. 27 | Sn—Fe | 0.8 | N-β (aminoethyl) γ-APS[7)] | Si, 7 | PET/IA(8%)[6)] | 25 |
| Ex. 28 | Sn—Fe | 0.8 | N-β (aminoethyl) γ-APS[7)] | Si, 7 | homo PET | 25 |
| Comp. Ex. 18 | Sn—Fe | 0.8 | N-β (aminoethyl) γ-APS[7)] | Si, 7 | PP | 25 |
| Comp. Ex. 19 | Sn—Fe | 0.8 | N-β (aminoethyl) γ-APS[7)] | Si, 7 | PE | 25 |
| Comp. Ex. 20 | Sn—Fe | 0.8 | N-β (aminoethyl) γ-APS[7)] | Si, 7 | epoxyacrylic paint | 10 |
| Comp. Ex. 21 | Sn—Fe | 0.8 | N-β (aminoethyl) γ-APS[7)] | Si, 7 | epoxyphenol paint | 10 |
| Comp. Ex. 22 | Sn—Fe | Sn0.8 | N-β (aminoethyl) γ-APS[7)] | Si, 7 | vinylorganosol | 15 |

[1)] γ-APS: silane coupling agent, γ-aminopropyltrimethoxysilane
[2)] γ-GPS: silane coupling agent, γ-glycidoxypropyltrimethoxysilane
[3)] BTSE: silane bis-1,2-(triethoxysilyl)ethane
[4)] BTSPS: silane bistrimethoxysilylpropyltetrasulfide
[5)] PET/IA(12%): polyethylene terephthalate/isophthalate (copolymerizing ratio, 12%)
[6)] PET/IA(8%): polyethylene terephthalate/isophthalate (copolymerizing ratio, 8%)
[7)] N-β (aminoethyl) γ-APS: silane coupling agent N-β (aminoethyl) γ-aminopropyltrimethoxysilane

TABLE 2

| | Work adhesion | | | Exposure | Can testing | |
|---|---|---|---|---|---|---|
| Experiment | Can barrel | Necking portion | Flanging portion | of metal (mA) | Dissolved iron (ppm) | Inner surface of can |
| Ex. 1 | ○ | ○ | ○ | 0.00 | 0.00 | normal |
| Ex. 2 | ○ | ○ | ○ | 0.00 | 0.00 | normal |
| Ex. 3 | ○ | ○ | ○ | 0.00 | 0.00 | normal |
| Ex. 4 | ○ | ○ | ○ | 0.00 | 0.00 | normal |
| Ex. 5 | ○ | ○ | ○ | 0.00 | 0.00 | normal |
| Ex. 6 | ○ | ○ | ○ | 0.00 | 0.00 | normal |
| Comp. Ex. 1 | ○ | ○ | Δ | 0.10 | 2.02 | double seamed portion partly corroded |
| Comp. Ex. 2 | ○ | Δ | X | 2.50 | 5.31 | necking portion, double seamed portion corroded |
| Ex. 7 | ○ | ○ | ○ | 0.00 | 0.00 | normal |
| Ex. 8 | ○ | ○ | ○ | 0.00 | 0.00 | normal |
| Ex. 9 | ○ | ○ | ○ | 0.00 | 0.00 | partly discolored under the film |
| Ex. 10 | ○ | ○ | ○ | 0.00 | 0.00 | normal |
| Ex. 11 | ○ | ○ | ○ | 0.00 | 0.00 | normal |
| Ex. 12 | ○ | ○ | ○ | 0.00 | 0.00 | normal |
| Ex. 13 | ○ | ○ | ○ | 0.00 | 0.00 | partly discolored under the film |
| Comp. Ex. 3 | ○ | ○ | Δ | 0.11 | 2.21 | necking portion, double seamed portion corroded |
| Comp. Ex. 4 | ○ | Δ | X | 2.52 | 5.95 | necking portion, double seamed portion corroded |
| Ex. 14 | ○ | ○ | ○ | 0.00 | 0.00 | partly discolored under the film |
| Ex. 15 | ○ | ○ | ○ | 0.00 | 0.00 | normal |
| Ex. 16 | ○ | ○ | ○ | 0.00 | 0.00 | normal |
| Ex. 17 | ○ | ○ | ○ | 0.00 | 0.00 | normal |
| Ex. 18 | ○ | ○ | ○ | 0.00 | 0.00 | partly discolored under the film |
| Comp. Ex. 5 | ○ | ○ | Δ | 0.13 | 3.00 | necking portion, double seamed portion corroded |
| Comp. Ex. 6 | ○ | Δ | X | 2.55 | 6.02 | necking portion, double seamed portion corroded |
| Comp. Ex. 7 | ○ | Δ | Δ | 0.56 | 2.45 | necking portion, double seamed portion partly corroded |
| Comp. Ex. 8 | ○ | Δ | Δ | 0.74 | 3.13 | necking portion, double seamed portion partly corroded |
| Comp. Ex. 9 | ○ | ○ | Δ | 0.08 | 0.92 | double seamed portion partly corroded |
| Ex. 19 | ○ | ○ | ○ | 0.00 | 0.00 | normal |
| Ex. 20 | ○ | ○ | ○ | 0.00 | 0.00 | normal |
| Ex. 21 | ○ | ○ | ○ | 0.00 | 0.00 | normal |
| Comp. Ex. 10 | ○ | Δ | X | 3.43 | 7.23 | necking portion, double seamed portion corroded |
| Comp. Ex. 11 | ○ | Δ | X | 4.77 | 8.54 | necking portion, double seamed portion corroded |
| Ex. 22 | ○ | ○ | ○ | 0.00 | 0.00 | normal |
| Ex. 23 | ○ | ○ | ○ | 0.00 | 0.00 | normal |
| Ex. 24 | ○ | ○ | ○ | 0.00 | 0.00 | normal |
| Comp. Ex. 12 | Δ | Δ | X | 4.29 | 8.17 | necking portion, double seamed portion corroded |
| Comp. Ex. 13 | Δ | Δ | X | 4.50 | 8.31 | necking portion, double seamed portion corroded |
| Comp. Ex. 14 | Δ | X | X | 6.12 | 11.2 | inner surface as a whole corroded |
| Comp. Ex. 15 | Δ | X | X | 5.99 | 10.5 | inner surface as a whole corroded |
| Ex. 25 | ○ | ○ | ○ | 0.00 | 0.00 | normal |
| Ex. 26 | ○ | ○ | ○ | 0.00 | 0.00 | normal |
| Comp. Ex. 16 | ○ | ○ | ○ | 0.32 | 1.20 | partly corroded under the film |
| Comp. Ex. 17 | ○ | Δ | Δ | 1.56 | 2.77 | necking portion, double seamed portion corroded |
| Ex. 27 | ○ | ○ | ○ | 0.00 | 0.00 | normal |
| Ex. 28 | ○ | ○ | ○ | 0.00 | 0.00 | normal |

TABLE 2-continued

| Experiment | Work adhesion: Can barrel | Work adhesion: Necking portion | Work adhesion: Flanging portion | Exposure of metal (mA) | Can testing: Dissolved iron (ppm) | Can testing: Inner surface of can |
|---|---|---|---|---|---|---|
| Comp. Ex. 18 | ○ | ○ | Δ | 0.49 | 1.82 | double seamed portion corroded |
| Comp. Ex. 19 | ○ | ○ | Δ | 0.53 | 2.12 | double seamed portion corroded |
| Comp. Ex. 20 | ○ | Δ | Δ | 15.4 | 29.3 | inner surface as a whole corroded |
| Comp. Ex. 21 | ○ | Δ | Δ | 12.6 | 25.7 | inner surface as a whole corroded |
| Comp. Ex. 22 | ○ | Δ | Δ | 8.24 | 20.2 | inner surface as a whole corroded |

TABLE 3

| Sample | Tin-plating: Amount of tin ($g/m^2$) | Tin-plating: Reflow | Surface treatment: Kind | Surface treatment: Treating thickness ($mg/m^2$) | Organic coating material: Kind | Organic coating material: Thickness (μm) |
|---|---|---|---|---|---|---|
| Ex. 29 | 0.5 | no | γ-APS[1)] | Si, 5 | PET/IA(12%)[5)] | 20 |
| Ex. 30 | 1.0 | yes | γ-APS[1)] | Si, 5 | PET/IA(12%)[5)] | 20 |
| Ex. 31 | 2.5 | yes | γ-APS[1)] | Si, 5 | PET/IA(12%)[5)] | 20 |
| Ex. 32 | 5.0 | yes | γ-APS[1)] | Si, 5 | PET/IA(12%)[5)] | 20 |
| Ex. 33 | 12.0 | yes | γ-APS[1)] | Si, 5 | PET/IA(12%)[5)] | 20 |
| Ex. 34 | 2.5 | no | γ-APS[1)] | Si, 5 | PET/IA(12%)[5)] | 20 |
| Comp. Ex. 23 | 0.3 | no | γ-APS[1)] | Si, 5 | PET/IA(12%)[5)] | 20 |
| Ex. 35 | 2.5 | yes | γ-APS[1)] | Si, 1 | PET/IA(12%)[5)] | 20 |
| Ex. 36 | 2.5 | yes | γ-APS[1)] | Si, 3 | PET/IA(12%)[5)] | 20 |
| Ex. 37 | 2.5 | yes | γ-APS[1)] | Si, 15 | PET/IA(12%)[5)] | 20 |
| Comp. Ex. 24 | 2.5 | yes | γ-APS[1)] | Si, 0.5 | PET/IA(12%)[5)] | 20 |
| Comp. Ex. 25 | 2.5 | yes | γ-APS[1)] | Si, 20 | PET/IA(12%)[5)] | 20 |
| Ex. 38 | 2.5 | yes | γ-GPS[2)] | Si, 5 | PET/IA(12%)[5)] | 20 |
| Ex. 39 | 2.5 | yes | BTSE[3)] → γ-APS 2-step treatment | Si, 10 | PET/IA(12%)[5)] | 20 |
| Ex. 40 | 2.5 | yes | mixed solution of BTSPS[4)], γ-APS | Si, 10 | PET/IA(12%)[5)] | 20 |
| Comp. Ex. 26 | 2.5 | yes | tetraethoxysilane | Si, 5 | PET/IA(12%)[5)] | 20 |
| Comp. Ex. 27 | 2.5 | yes | BTSE[3)] | Si, 5 | PET/IA(12%)[5)] | 20 |
| Comp. Ex. 28 | 2.5 | yes | phosphoric acid | P, 2.5 | PET/IA(12%)[5)] | 20 |
| Comp. Ex. 29 | 2.5 | yes | tin phosphate | P, 2.5 Sn, 2.5 | PET/IA(12%)[5)] | 20 |
| Ex. 41 | 2.5 | yes | N-β (aminoethyl) γ-APS[8)] | Si, 7 | PET/IA(12%)[5)] | 10 |
| Ex. 42 | 2.5 | yes | N-β (aminoethyl) γ-APS[8)] | Si, 7 | PET/IA(12%)[5)] | 40 |
| Comp. Ex. 30 | 2.5 | yes | N-β (aminoethyl) γ-APS[8)] | Si, 7 | PET/IA(12%)[5)] | 7 |
| Comp. Ex. 31 | 2.5 | yes | N-β (aminoethyl) γ-APS[8)] | Si, 7 | PET/IA(12%)[5)] | 45 |
| Ex. 43 | 2.5 | yes | N-β (aminoethyl) γ-APS[8)] | Si, 7 | PET/IA(8%)[6)] | 25 |
| Ex. 44 | 2.5 | yes | N-β (aminoethyl) γ-APS[8)] | Si, 7 | homo PET[7)] | 25 |
| Ex. 45 | 2.5 | yes | N-β (aminoethyl) γ-APS[8)] | Si, 7 | biaxially drawn homo PET | 25 |
| Comp. Ex. 32 | 2.5 | yes | N-β (aminoethyl) γ-APS[8)] | Si, 7 | polypropylene film | 25 |
| Comp. Ex. 33 | 2.5 | yes | N-β (aminoethyl) γ-APS[8)] | Si, 7 | polyethylene film | 25 |
| Comp. Ex. 34 | 2.5 | yes | N-β (aminoethyl) γ-APS[8)] | Si, 7 | epoxyacrylic paint | 10 |
| Comp. Ex. 35 | 2.5 | yes | N-β (aminoethyl) γ-APS[8)] | Si, 7 | epoxyphenol paint | 10 |
| Comp. Ex. 36 | 2.5 | yes | N-β (aminoethyl) γ-APS[8)] | Si, 7 | vinylorganosol | 15 |
| Ex. 46 | 2.5 | yes | γ-APS[1)] | Si, 5 | PET/IA(12%)[5)] 85% ionomer 8% | 20 |
| Ex. 47 | 2.5 | yes | γ-APS[1)] | Si, 5 | PET/IA(12%)[5)] 92% ionomer 8% | 20 |

[1)]γ-APS: silane coupling agent, γ-aminopropyltrimethoxysilane
[2)]γ-GPS: silane coupling agent, γ-glycidoxypropyltrimethoxysilane
[3)]BTSE: silane bis-1,2-(triethoxysilyl)ethane
[4)]BTSPS: silane bistrimethoxysilylpropyltetrasulfide
[5)]PET/IA(12%): polyethylene terephthalate/isophthalate (copolymerizing ratio, 12%)
[6)]PET/IA(8%): polyethylene terephthalate/isophthalate (copolymerizing ratio, 8%)
[7)]Home PET: homopolyethylene terephthalate
[8)]N-β (aminoethyl) γ-APS: silane coupling agent N-β (aminoethyl) γ-aminopropyltrimethoxysilane

TABLE 4

| | Work adhesion | | | Exposure | Can testing | |
|---|---|---|---|---|---|---|
| Experiment | Can barrel | Necking portion | Flanging portion | of metal (mA) | Elution of iron (ppm) | Inner surface of can |
| Ex. 29 | ○ | ○ | ○ | 0.00 | 0.00 | normal |
| Ex. 30 | ○ | ○ | ○ | 0.00 | 0.00 | normal |
| Ex. 31 | ○ | ○ | ○ | 0.00 | 0.00 | normal |
| Ex. 34 | ○ | ○ | ○ | 0.00 | 0.00 | normal |
| Ex. 33 | ○ | ○ | ○ | 0.00 | 0.00 | normal |
| Ex. 34 | ○ | ○ | ○ | 0.00 | 0.00 | normal |
| Comp. Ex. 23 | ○ | ○ | Δ | 0.10 | 0.70 | wrap-seamed portion partly corroded |
| Ex. 35 | ○ | ○ | ○ | 0.00 | 0.00 | normal |
| Ex. 36 | ○ | ○ | ○ | 0.00 | 0.00 | normal |
| Ex. 37 | ○ | ○ | ○ | 0.00 | 0.00 | normal |
| Comp. Ex. 24 | ○ | Δ | X | 3.56 | 5.65 | necking portion, wrap-seamed portion partly corroded |
| Comp. Ex. 25 | ○ | Δ | X | 4.74 | 6.48 | necking portion, wrap-seamed portion partly corroded |
| Ex. 38 | ○ | ○ | ○ | 0.00 | 0.00 | normal |
| Ex. 39 | ○ | ○ | ○ | 0.00 | 0.00 | normal |
| Ex. 40 | ○ | ○ | ○ | 0.00 | 0.00 | normal |
| Comp. Ex. 26 | Δ | Δ | X | 5.43 | 6.82 | necking portion, wrap-seamed portion corroded |
| Comp. Ex. 27 | Δ | Δ | X | 5.77 | 6.98 | necking portion, wrap-seamed portion corroded |
| Comp. Ex. 28 | Δ | X | X | 6.29 | 8.17 | necking portion, wrap-seamed portion corroded |
| Comp. Ex. 29 | Δ | X | X | 6.50 | 8.39 | necking portion, wrap-seamed portion corroded |
| Ex. 41 | ○ | ○ | ○ | 0.00 | 0.00 | normal |
| Ex. 42 | ○ | ○ | ○ | 0.00 | 0.00 | normal |
| Comp. Ex. 30 | ○ | ○ | ○ | 0.32 | 1.12 | partly corroded under the film |
| Comp. Ex. 31 | ○ | Δ | Δ | 2.16 | 1.67 | necking portion, wrap-seamed portion corroded |
| Ex. 43 | ○ | ○ | ○ | 0.00 | 0.00 | normal |
| Ex. 44 | ○ | ○ | ○ | 0.01 | 0.00 | wrap-seamed portion partly and slightly discolored |
| Ex. 45 | ○ | ○ | ○ | 0.02 | 0.01 | wrap-seamed portion partly and slightly discolored |
| Comp. Ex. 32 | ○ | ○ | Δ | 0.58 | 1.12 | wrap-seamed portion corroded |
| Comp. Ex. 33 | ○ | ○ | Δ | 0.63 | 2.18 | wrap-seamed portion corroded |
| Comp. Ex. 34 | ○ | Δ | Δ | 17.4 | 25.2 | inner surface as a whole corroded |
| Comp. Ex. 35 | ○ | Δ | Δ | 14.2 | 21.7 | inner surface as a whole corroded |
| Comp. Ex. 36 | ○ | Δ | Δ | 9.82 | 17.2 | inner surface as a whole corroded |
| Ex. 46 | ○ | ○ | ○ | 0.00 | 0.00 | normal |
| Ex. 47 | ○ | ○ | ○ | 0.00 | 0.00 | normal |

The following will be learned from the above Examples and Comparative Examples.

Examples 1 to 18 and Comparative Examples 1 to 9 have tested stretch-ironed cans having a reduced thickness made of resin-coated steel plates obtained by varying the composition and amounts of components of the alloy layer formed on the steel plate. It will be learned that the cans made of a resin-coated steel plate provided with an alloy layer containing iron and at least one kind of metal selected from tin, zinc and nickel, exhibit superior corrosion resistance to those of cans made of resin-coated steel plates provided with other alloy layers. In particular, excellent corrosion resistance and work adhesion property are exhibited when the steel plate is provided with an alloy layer containing tin in an amount of larger than 0.05 $g/m^2$ but smaller than 1.5 $g/m^2$, an iron-tin-nickel alloy layer, an iron-tin-zinc alloy layer, an iron-nickel alloy layer containing nickel in an amount of larger than 0.03 $g/m^2$ but smaller than 1.8 $g/m^2$, and with an iron-zinc alloy layer containing zinc in an amount of larger than 0.03 $g/m^2$ but smaller than 1.8 $g/m^2$.

Examples 19 to 21 and Comparative Examples 10 and 11 have tested stretch-ironed cans having a reduced thickness made of resin-coated steel plates obtained by varying the thickness of the silane coupling agent-treated layer. It will be learned that excellent corrosion resistance and work adhesion properties are obtained when the cans are made of resin-coated steel plates having a film of a thickness of an Si amount of 0.8 to 18 $mg/m^2$.

Examples 22 to 24 and Comparative Examples 12 to 15 have tested deep-draw-formed cans having a reduced thickness made of resin-coated steel plates obtained by using different kinds of surface treating agents. It will be learned that the cans made of resin-coated steel plates obtained by using an organosilane coupling agent having a reaction group such as amino group or epoxy group and a hydrolyzing alkoxyl group, exhibit superior corrosion resistance and work adhesion properties to those of the cans made of resin-coated steel plates obtained by using a silane treating agent without containing such groups, by using a phosphoric acid treating agent, or by using a tin phosphate treating agent.

Examples 25 and 26 and Comparative Examples 16 and 17 have tested deep-draw-formed cans having a reduced thickness made of resin-coated steel plates obtained by varying the thickness of the copolymerized polyester film. It will be learned that the cans made of a resin-coated steel plate coated with a polyester film of a thickness of 8 to 24 μm exhibit superior corrosion resistance and work adhesion properties to those of the cans made of resin-coated steel plates coated with the polyester film having a thickness without lying in the above range.

Examples 27 and 28 and Comparative Examples 18 to 22 have tested the stretch-ironed cans having a reduced thickness made of resin-coated steel plates obtained by using organic coating materials of different kinds. It will be learned that the cans made of a resin-coated steel plate obtained by using an organic coating material of polyester exhibit superior corrosion resistance and work adhesion properties to the cans made of resin-coated steel plates obtained by using films and coating materials of other kinds.

Examples 29 to 34 and Comparative Example 23 have tested deep drawn cans having a reduced thickness made of resin-coated steel plates obtained by varying the amount of tin that is plated on the steel plates. It will be learned that excellent corrosion resistance and work adhesion properties are exhibited when the cans are made of resin-coated steel plates plated with tin in an amount of not smaller than 0.5 $g/m^2$.

Examples 29 to 34 are comparative experiments of when the reflow treatment is not effected after the tin plating and when the reflow treatment is executed to transform part of the tin layer on the side of the steel plate into a tin-iron alloy layer. It will be learned that excellent corrosion resistance and work adhesion properties are exhibited by the stretch-ironed cans having a reduced thickness made of resin-coated steel plates when tin is plated in an amount of not smaller than 0.5 g/m2 on each surface.

Examples 35 to 37 and Comparative Examples 24 and 25 have tested stretch-ironed cans having a reduced thickness made of resin-coated steel plates obtained by varying the thickness of the film treated with the silane coupling agent. It will be learned that the cans made of resin-coated steel plates containing Si in the film in an amount of 0.8 to 18 $g/m^2$ exhibit superior corrosion resistance and work adhesion properties to those of the cans made of resin-coated steel plates having a film of a thickness without lying in the above range.

Examples 38 to 40 and Comparative Examples 26 to 29 have tested stretch-ironed cans having a reduced thickness made of resin-coated steel plates obtained by using surface treating agents of different kinds. It will be learned that the cans made of resin-coated steel plates obtained by using an organosilane coupling agent containing a reaction group such as amino group or epoxy group and a hydrolyzing alkoxyl group exhibit superior corrosion resistance and work adhesion properties to those of the cans made of resin-coated steel plates obtained by using a silane treating agent without containing such groups, by using a phosphoric acid treating agent, or by using a tin phosphate treating agent.

Examples 41 to 43 and Comparative Examples 30 and 31 have tested the stretch-ironed cans having a reduced thickness made of resin-coated steel plates obtained by varying the thickness of the copolymerized polyester film. It will be learned that the cans made of a resin-coated steel plate coated with the polyester film of a thickness of 8 to 42 μm exhibit superior corrosion resistance and work adhesion properties to those of the cans made of the resin-coated steel plates coated with the polyester film having a thickness without lying in the above range.

Examples 43 to 47 and Comparative Examples 32 to 36 have tested the stretch-ironed cans having a reduced thickness made of resin-coated steel plates obtained by using organic coating materials of different kinds. It will be learned that the cans made of a resin-coated steel plate coated with the organic coating material of polyester exhibit superior corrosion resistance and work adhesion properties to those of the cans made of the resin-coated steel plates coated with the resins or coating materials of other kinds. As the polyester, further, excellent properties are obtained when non-oriented polyethylene terephthalate type copolymerized resin coatings are used. Among them, the most excellent properties are exhibited by the non-oriented polyethylene terephthalate/isophthalate copolymerized resin coating. Excellent properties are further exhibited by the resin coating obtained by blending the undrawn polyethylene terephthalate-type copolymer resin with an ionomer resin.

INDUSTRIAL APPLICABILITY

The resin-coated steel plate of this invention is a chromium-free resin-coated steel plate exhibiting excellent work adhesion properties between the steel plate and the organic resin film even at portions subjected to a severe working in which a ratio expressed by the following formula (1) and an average plate thickness reduction ratio expressed by the following formula (2) are, $$\text{Height } (H) \text{ of can/can diameter } (D) \geqq 1 \quad (1)$$

$$[(\text{Initial plate thickness } (t_0) - \text{can wall thickness } (t)) / \text{initial plate thickness } (t_0)\} \times 100 \geqq 20\% \quad (2)$$

such as draw-ironing for reducing the thickness, deep drawing for reducing the thickness, or stretch-ironing, or flanging or necking, and provides cans having excellent workability and corrosion resistance.

The invention claimed is:

1. A can obtained by press-forming a resin-coated steel plate obtained by providing, on at least one surface of the steel plate, (i-1) an alloy layer of iron and at least one metal selected from tin, zinc and nickel, wherein when the alloy layer contains tin, the content of tin is in a range of larger than 0.05 $g/m^2$ but is smaller than 1.5 $g/m^2$, when the alloy layer contains zinc, the content of zinc is larger than 0.03 $g/m^2$ but is smaller than 1.8 $g/m^2$, and when the alloy layer contains nickel, the content of nickel is larger than 0.03 $g/m^2$ but is smaller than 1.8 $g/m^2$, or (i-2) a tin-plated layer containing tin in an amount of 0.5 $g/m^2$ to 12 $g/m^2$, (ii) a silane coupling agent-treated layer, and (iii) a copolymerized resin layer of a polyethylene terephthalate in this order from the side of the steel plate.

2. A can according to claim 1, wherein the tin-plated layer (i-2) is provided on the at least one surface of the steel plate and further comprising an alloy layer which contains tin and iron in direct contact with said steel plate.

3. A can according to claim 1, wherein the amount of Si in the (ii) silane coupling agent-treated layer is in a range of 0.8 to 18 $mg/m^2$.

4. A can according to claim 1, wherein the silane coupling agent-treated layer is a layer formed by treatment with an amino group-containing silane solution and/or an epoxy group-containing silane coupling agent solution.

5. A can according to claim 1, wherein the silane coupling agent-treated layer is a layer formed by treatment with a mixed solution of a silane coupling agent containing an amino group and/or an epoxy group and a silane containing an organic substituent and a hydrolyzing alkoxyl group.

6. A can according to claim 1, wherein the silane coupling agent-treated layer is a layer treated with a silane having an organic substituent and a hydrolyzing alkoxyl group and is, then, treated with a silane coupling agent solution comprising an amino group-containing silane solution and/or an epoxy group-containing silane solution.

7. A can according to claim 1, wherein the copolymerized resin layer has a thickness of 8 to 42 μm.

8. A can according to claim 1, wherein the copolymerized resin layer of a polyethylene terephthalate is a polyethylene terephthalate/isophthalate copolymerized resin layer.

9. A can according to claim 1, wherein the copolymerized resin layer of a polyethylene terephthalate contains an ionomer resin.

* * * * *